United States Patent [19]

Rothfuss et al.

[11] Patent Number: 4,905,971
[45] Date of Patent: Mar. 6, 1990

[54] REFRACTORY CERAMIC SINK

[75] Inventors: Hans Rothfuss, Taunusstein; Jochen Kopia, Bendorf; Jurgen Sauthoff, Wiesbaden, all of Fed. Rep. of Germany

[73] Assignee: Didier-Werke AG, Wiesbaden, Fed. Rep. of Germany

[21] Appl. No.: 216,527

[22] Filed: Jul. 7, 1988

[30] Foreign Application Priority Data

Aug. 21, 1987 [DE] Fed. Rep. of Germany ....... 3727938

[51] Int. Cl.$^4$ ............................................. C21C 5/48
[52] U.S. Cl. ..................................... 266/266; 266/218
[58] Field of Search ............... 266/218, 220, 224, 265, 266/266

[56] References Cited

FOREIGN PATENT DOCUMENTS 3246937 7/1983 Fed. Rep. of Germany .
3538498 5/1987 Fed. Rep. of Germany ...... 266/265

Primary Examiner—Robert McDowell
Attorney, Agent, or Firm—Wenderoth, Lind & Ponack

[57] ABSTRACT

A refractory ceramic sink includes a frusto-conically shaped internal ceramic element having upper and lower end surfaces and an outer surface extending between the upper and lower end surfaces, and an external ceramic element encompassing the internal ceramic element and having upper and lower end surfaces and an inner surface extending between the upper and lower end surfaces and shaped complementary to the outer surface of the internal ceramic element. Channels are formed directly in at least one of the inner surface of the external ceramic element and the outer surface of the internal ceramic element, the channels extending from the bottom to the top of the sink.

14 Claims, 2 Drawing Sheets

REFRACTORY CERAMIC SINK

BACKGROUND OF THE INVENTION

The present invention relates to a sink or gas permeable member made of fireproof or refractory ceramic material having extending therethrough channels for the passage therethrough of a gas. Such sinks are conventional in many technologies, for example for use in supplying a gas into molten metal within a metallurgical vessel. The present invention also relates to a process for the production of the novel sink of the present invention.

A refractory ceramic sink of this general type is described in DE-OS 32 46 937. In this known arrangement, channels are created by burning out a network of synthetic material embedded in a previously formed ceramic element. This arrangement is not entirely satisfactory, since the burning away operation is undesirable.

SUMMARY OF THE INVENTION

Accordingly, it is an object of the present invention to provide an improved sink of this general type whereby the channels extending therethrough can be formed in a simple manner, and whereby it is possible to overcome the above and other prior art disadvantages. It is a further object of the present invention to provide a novel process for production of such sink.

These objects are achieved in accordance with the present invention by the provision of a refractory ceramic sink including a frusto-conically shaped internal ceramic element having an upper end surface, a lower end surface and an outer surface extending between the upper and lower end surfaces, and an external ceramic element encompassing the internal ceramic element and having an upper end surface, a lower end surface and an inner end surface extending between the upper and lower end surfaces and shaped complementary to the outer surface of the internal ceramic element. Channels are formed directly in at least one of the inner surface of the external ceramic element and the outer surface of the internal ceramic element, and such channels extend from the lower end surface to the upper end surface of the respective ceramic element. The upper end surfaces of the internal and external ceramic elements are coplanar, and the lower end surfaces of the internal and external ceramic elements also are coplanar.

The two ceramic elements are formed independently of each other and then are joined together. The formation of the two ceramic elements separately and the positioning of the channels at the interface between the inner surface of the external ceramic element and the outer surface of the internal ceramic element ensures that the channels are open prior to the joining of the internal and external ceramic elements. Thus, it is possible to avoid the disadvantages of the prior art wherein the channel forming material has to be removed from the sink by burning or other chemical means.

To produce the external ceramic element of the sink, a form or mold is used in which a frusto-conically shaped mandrel is centrally placed. To form the channels on the inner surface of the external ceramic element to be formed, the mandrel can have ridges that correspond to the channels to be formed. Additionally however, the mandrel can have detachably positioned thereon, for example by coating, material, such as netting formed of pliant material, in particular dense synthetic material or metal. The ridges or shapes of the netting correspond to the channels to be formed on the inner surface of the external element. The internal ceramic element of the sink may be similarly formed, a preferable arrangement being to employ a form or mold having integral ridges corresponding to the channels to be formed on the outer surface of the internal ceramic element. Each ceramic element preferably is produced by employing a mixture of alumina or sintered magnesia refractory granular material, ceramic binder and mixing fluid, shaping the mixture by casting or pressing into the shape of the respective ceramic element, and then drying or tempering, firing or baking the thus shaped material to form the respective ceramic element.

The cross section of the channels preferably is U-shaped or V-shaped. In an advantageous arrangement, the channels are formed directly on both the outer surface of the internal ceramic element and the inner surface of the external ceramic element, the channels in the outer surface crossing the channels in the inner surface, thereby forming a continuous network or reticulate arrangement between the upper and lower end surfaces of the sink. The channels in either the outer surface or the inner surface may extend in planes containing the conical axis of the frusto-conically shaped internal ceramic element, and the channels in the other surface may extend concentrically or helically of such axis. The channels in both surfaces may extend helically, and in a particular arrangement the helical direction of the channels in one surface is opposite to the helical direction of the channels in the other surface. In a further advantageous arrangement of the present invention, the channels are formed in only one of the surfaces and such channels are net-like or reticular.

BRIEF DESCRIPTION OF THE DRAWINGS

Other objects, features and advantages of the present invention will be apparent from the following detailed description of preferred embodiments thereof, with reference to the accompanying drawings, wherein.

DETAILED DESCRIPTION OF THE INVENTION

Figure 1:
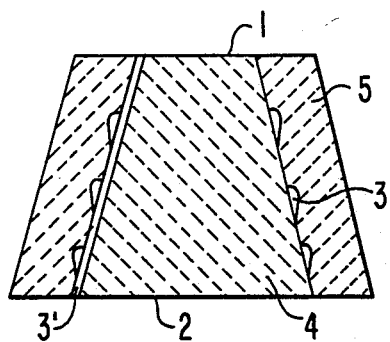
FIG. 1 is an axial cross sectional view through joined external and internal ceramic elements forming a sink in accordance with one embodiment of the present invention.

FIG. 1 shows a first embodiment of a refractory ceramic sink according to the present invention. The sink includes a frusto-conically shaped internal ceramic element 4 having upper and lower end surfaces and an outer surface extending between the upper and lower surfaces. The sink also includes an external ceramic element 5 encompassing internal ceramic element 4 and having upper and lower end surfaces and an inner surface extending between such upper and lower end surfaces and shaped complementary to the outer surface of internal ceramic element 4. The upper end surfaces of ceramic elements 4, 5 are coplanar to define an upper end surface 1 of the sink. Similarly, the lower end surfaces of ceramic elements 4, 5 are coplanar to define a lower end surface 2 of the sink. The other conventional components of the sink, for example gas connecting sleeves, sheet metal on the lower end surface 2, a gas collection area and sheet metal casing around the external ceramic element extending through the height of the sink from the bottom to the top thereof are not illustrated or described herein, since it is intended that the novel sink structure of the present invention be employed in the otherwise conventional manner using conventional such elements.

The gas permeability of the sink of the present invention is achieved by crossing channels formed in both the inner surface of the external ceramic element 5 and the outer surface of the internal ceramic element 4. Thus, external ceramic element 5 has formed in the inner surface thereof annular channels 3 that are concentric to the conical axis of the internal ceramic element and therefore of the sink. Also, the internal ceramic element 4 has formed on the outer surface thereof a plurality of longitudinal channels 3' each of which extends in a plane containing the conical axis of the frustoconically shaped internal ceramic element. Channels 3' preferably are distributed uniformly around the conical axis. The channels 3, 3' are on the interface between the external and internal ceramic elements and cross each other, thereby providing a gas permeable channel network extending from the bottom of the sink to the top thereof.

Figure 2:
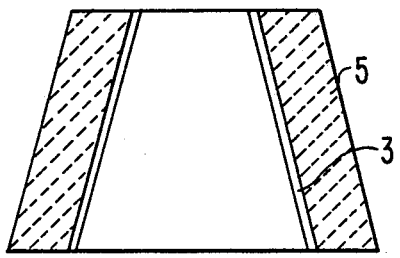
FIGS. 2 and 3 are cross sectional views of external and internal ceramic elements, respectively, in accordance with another embodiment of the present invention.
Figure 3:
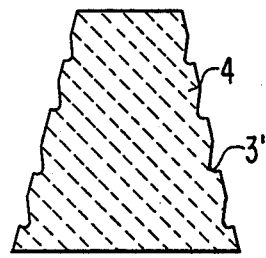

FIGS. 2 and 3 illustrate external and internal ceramic elements, respectively, similar to the embodiment of FIG. 1, but wherein the shape of the channels is reversed. Thus, channels 3 in the external ceramic element 5 extend longitudinally in respective planes containing the conical axis, and channels 3' in the internal ceramic element 4 are concentric to the conical axis.

Figure 4:
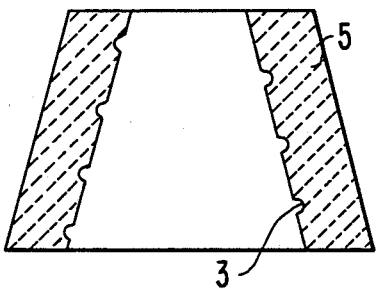
FIGS. 4 and 5 are similar views of external and internal ceramic elements, respectively, in accordance with another embodiment of the present invention.
Figure 5:
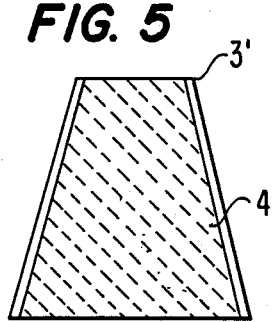

FIGS. 4 and 5 illustrate an arrangement similar to the embodiment of FIG. 1, but wherein the channel 3 in the inner surface of the external ceramic element 5 is a single helical channel, rather than a plurality of separate concentric channels.

Figure 6:
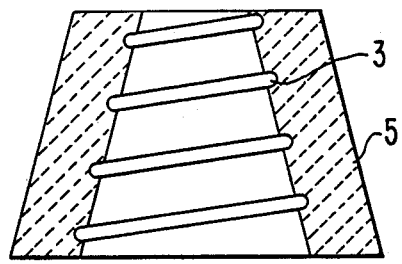
FIGS. 6 and 7 are similar views of external and internal ceramic elements, respectively, of still another embodiment of the present invention.
Figure 7:
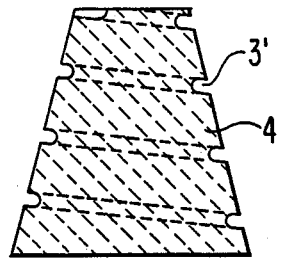

FIGS. 6 and 7 illustrate a modification of such arrangement. In this embodiment, the channel 3' in the internal ceramic element 4 also is in the form of a single helical channel. However, the helical direction of channel 3 in external ceramic element 5 is opposite to the helical direction of channel 3' in internal ceramic element 4. The channels 3, 3' thus cross each other.

Figure 8:
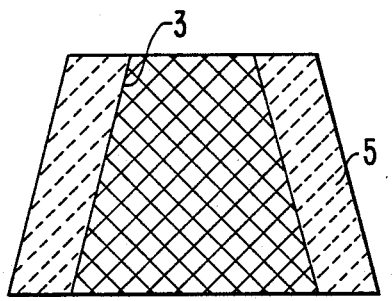
FIGS. 8 and 9 are similar views of external and internal ceramic elements, respectively, of yet another embodiment of the present invention.
Figure 9:
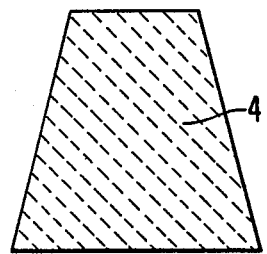

The embodiment of FIGS. 8 and 9 is somewhat different than the above embodiments in that channels are formed only in the inner surface of the external ceramic element 5. The outer surface of internal ceramic element 4 is smooth and without channels. The channels 3 are reticular or net-like. The arrangement of FIGS. 8 and 9 could be reversed however, such that the reticular or net-like channels could be formed on the outer surface of internal ceramic element 4, and the inner surface of external ceramic element 5 could be smooth and without channels. Also, it of course would be possible to provide reticular or net-like channels in both the inner surface of the external ceramic element 5 and the outer surface of the internal ceramic element 4.

In accordance with the present invention it is intended that any combination of the above or other channel configurations could be employed on the complementary and abutting surfaces of the internal and external ceramic elements, the intended result being the formation of a network of crossing channels extending from the bottom of the sink to the top thereof.

Figure 10:
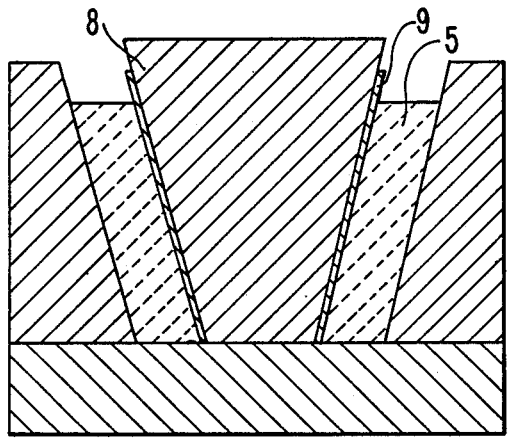
FIG. 10 is a schematic cross sectional view illustrating a process for production of the external ceramic element shown in FIG. 2.

FIG. 10 schematically illustrates one manner of producing the external ceramic element 5 of the present invention, and specifically as shown in FIG. 2. Thus, a fireproof or refractory ceramic casting mass is cast in a mold or form including a central mandrel 8 corresponding to the dimensions of the internal ceramic element. The mandrel is coated by a pliant netting 9 having a structure corresponding to the desired channels 3 to be formed in the external ceramic element 5 to be produced. In the arrangement illustrated in FIG. 10, pliant netting 9 is in a form to produce the longitudinal channels 3 shown in FIG. 2. It is intended to be within the scope of the present invention that the casting mass be a mixture as would be understood by one of ordinary skill in the art suitable for the formation of the respective ceramic element. It particularly is contemplated that such a mixture be of alumina or sintered magnesia refractory granular material, ceramic binder and mixing fluid. One skilled in the art particularly would understand the relative quantities, grain size and specific materials that could be employed. The mixture is cast in the mold shown in FIG. 10, or could be pressed therein to form the shape of the external ceramic element 5. The thus shaped material then is dried and, as necessary, tempered or fired or baked at a temperature of approximately 350° C. to form the resultant ceramic element. The mandrel 8 shown in FIG. 10 can have the pliant netting 9 shaped in accordance with the desired channel shape of any of the above discussed embodiments.

Alternatively, mandrel 8 can include integral ridges extending from its surface and corresponding to the desired shape of the channels of any of the above discussed embodiments. For such a mandrel with ridges that are helical to the conical axis, the mandrel would be helically extracted from the formed external ceramic element 5.

Figure 11:
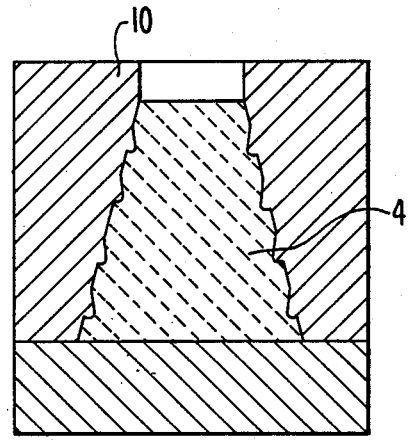
FIG. 11 is a schematic cross sectional view illustrating a process for production of the internal ceramic element of FIG. 3.

FIG. 11 schematically illustrates a manner of forming an internal ceramic element, and specifically the internal ceramic element 4 shown in FIG. 3. A form or mold 10 has internal V-shaped ridges that are concentric to the conical axis. These ridges form the channels 3' shown in FIG. 3. However, such ridges alternatively could be in the shape of the channels shown in FIGS. 5 and 7. The ridges also could be shaped other than V-shaped, for example U-shaped.

The internal and external ceramic elements are formed totally independently, and then the prefabricated elements are assembled such that the respective inner and outer surfaces are in abutment and with the channels 3, 3' crossing. This results in a network configuration of channels 3, 3' extending from the bottom of the sink to the top thereof. In order to mount the internal element within the external element, a thin layer of binder, such as an aqueous solution of water glass, monoaluminum phosphate or an aqueous solution of silicon dioxide colloidal solution can be used. The sink subsequently can be dried and/or tempered, fired or baked at a temperature of approximately 350° C. It particularly is contemplated that such heat treatment could be achieved after assembly of the internal and external ceramic elements.

Although the present invention has been described and illustrated with respect to preferred embodiments thereof, it is to be understood that various modifications and changes may be made to the specifically described and illustrated features without departing from the scope of the present invention.

What is claimed:

1. A refractory ceramic sink comprising:
a frustoconically shaped internal ceramic element having an upper end surface, a lower end surface and an outer surface extending between said upper and lower end surfaces;
an external ceramic element encompassing said internal ceramic element and having an upper end surface, a lower end surface and an inner surface extending between said upper and lower end surfaces and shaped complementary to said outer surface of said internal ceramic element; and
channels formed directly in both said inner surface of said external ceramic element and said outer surface of said internal ceramic element, said channels extending from said lower end surface to said upper end surface of the respective said ceramic element, said channels in said outer surface crossing said channels in said inner surface.

2. A sink as claimed in claim 1, wherein said upper end surfaces of said internal and external ceramic elements are coplanar, and said lower end surfaces of said internal and external ceramic elements are coplanar.

3. A sink as claimed in claim 1, wherein the cross section of said channels is U-shaped or V-shaped.

4. A sink as claimed in claim 1, wherein said channels in said outer surface extend in planes containing the axis of said frusto-conically shaped internal ceramic element.

5. A sink as claimed in claim 4, wherein said channels in said inner surface extend concentrically of said axis.

6. A sink as claimed in claim 4, wherein said channels in said inner surface extend helically of said axis.

7. A sink as claimed in claim 1, wherein said channels in said inner surface extend in planes containing the axis of said frusto-conically shaped internal ceramic element.

8. A sink as claimed in claim 7, wherein said channels in said outer surface extend concentrically of said axis.

9. A sink as claimed in claim 7, wherein said channels in said outer surface extend helically of said axis.

10. A sink as claimed in claim 1, wherein said channels in said outer and inner surfaces extend helically.

11. A sink as claimed in claim 10, wherein the helical direction of said channels in said outer surface is opposite to the helical direction of said channels in said inner surface.

12. A refractory ceramic sink comprising:
a frusto-conically shaped internal ceramic element having an upper end surface, a lower end surface and an outer surface extending between said upper and lower end surfaces;
an external ceramic element encompassing said internal ceramic element and having an upper end surface, a lower end surface and an inner surface extending between said upper and lower end surfaces and shaped complementary to said outer surface of said internal ceramic element; and
channels formed directly in said outer surface of said internal ceramic element only, said channels being reticular and extending from said lower end surface to said upper end surface of the respective said ceramic element.

13. A refractory ceramic sink comprising:
a frusto-conically shaped internal ceramic element having an upper end surface, a lower end surface and an outer surface extending between said upper and lower end surfaces;
an external ceramic element encompassing sad internal ceramic element and having an upper end surface, a lower end surface and an inner surface extending between said upper and lower end surfaces and shaped complementary to said outer surface of said internal ceramic element; and
channels formed directly in said inner surface of said external ceramic element only said channels being reticular and extending from said lower end surface to said upper end surface of the respective said ceramic element.

14. A refractory ceramic sink comprising:
a frusto-conically shaped internal ceramic element having an upper end surface, a lower end surface and an outer surface extending between said upper and lower end surfaces;
an external ceramic element encompassing said internal ceramic element and having an upper end surface, a lower end surface and an inner surface extending between said upper and lower end surfaces and shaped complementary to said outer surface of said internal ceramic element; and
channels formed directly in at least one of said inner surface of said external ceramic element and said outer surface of said internal ceramic element, and said channels extending helically of the axis of said frusto-conically shaped internal ceramic element.

* * * * *